United States Patent [19]
Zaun et al.

[11] 3,791,451
[45] Feb. 12, 1974

[54] ROOT CROP HARVESTING IMPLEMENT

[75] Inventors: Richard David Zaun; Richard Wayne Hook, both of Des Moines, Iowa

[73] Assignee: Deere & Company, Moline, Ill.

[22] Filed: Dec. 17, 1971

[21] Appl. No.: 209,124

[52] U.S. Cl.................................. 171/58, 171/113
[51] Int. Cl............................................. A01d 17/00
[58] Field of Search... 171/18, 25, 28, 58, 113, 118, 171/133, 23, 138, 144; 214/17 C

[56] References Cited
UNITED STATES PATENTS

| | | | |
|---|---|---|---|
| 2,693,068 | 11/1954 | Rodin | 171/23 |
| 1,714,889 | 5/1929 | Raoult | 171/113 |
| 2,630,051 | 3/1953 | Palmer | 171/113 |
| 518,770 | 4/1894 | Young | 171/113 |
| 1,331,957 | 2/1920 | Devey | 171/113 |
| 2,726,500 | 12/1955 | Faust | 171/118 |
| 3,294,177 | 12/1966 | Schaal et al. | 171/58 |
| 3,348,706 | 10/1967 | Hyman | 214/17 C |

*Primary Examiner*—Antonio F. Guida

[57] ABSTRACT

A root crop harvester includes a main frame, a plurality of digger wheels on the front of the main frame, conveyor means supported on the frame to receive roots from the digger wheels and deliver the same to a transversely extending auger conveyor which moves the roots to a vertical auger conveyor. An additional conveyor mounted on the upper end of the vertical auger conveyor in root-receiving relationship therewith moves the roots laterally outwardly to a deposit area. In one embodiment of the invention, a plurality of grab rolls are associated with the transverse auger conveyor to clean the roots as they are moved to the vertical auger conveyor.

12 Claims, 6 Drawing Figures

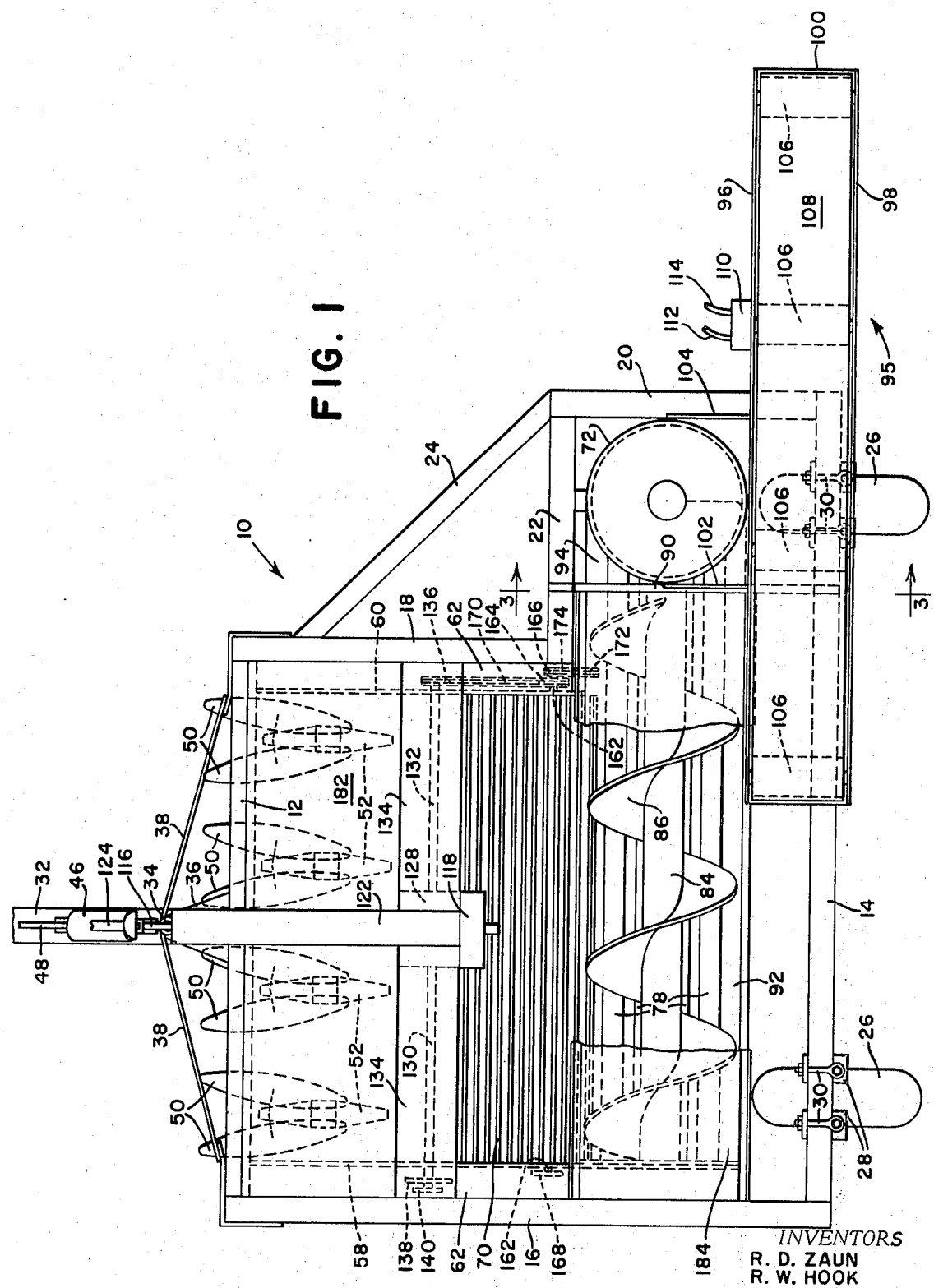

INVENTORS
R. D. ZAUN
R. W. HOOK

BY R L Hollister

ATTORNEY

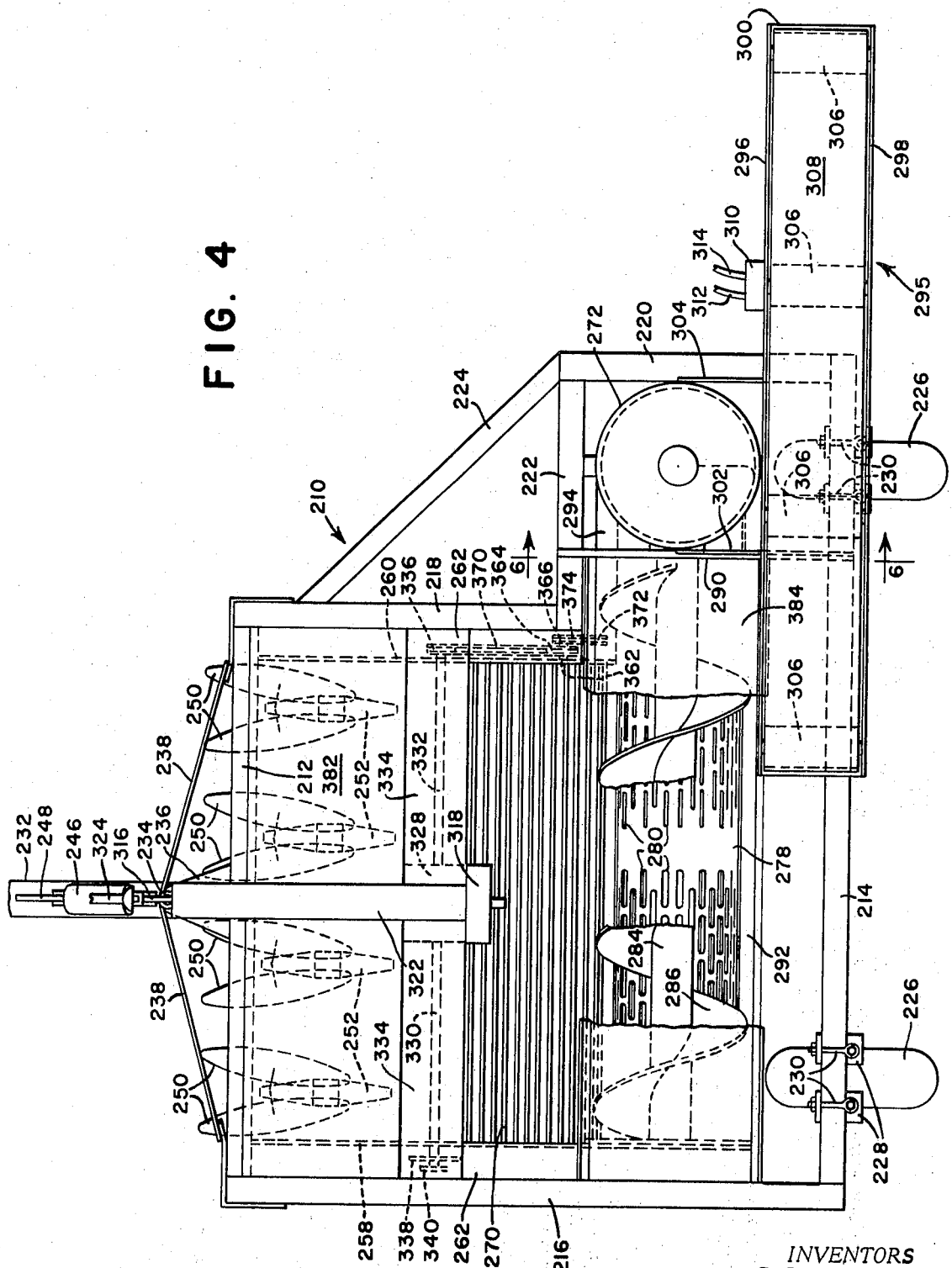

ROOT CROP HARVESTING IMPLEMENT

CROSS REFERENCE TO RELATED APPLICATIONS

This application discloses subject matter common to copending U. S. applications Ser. Nos. 209,116, 209,117, and 209,123, now U.S. Patent No. 3,695,360, all filed concurrently herewith. Application Serial No. 209,123 issued as patent No. 3,695,360, on October 3, 1972.

BACKGROUND OF THE INVENTION

The present invention relates generally to agricultural harvesting equipment and more particularly relates to harvesters for root crops such as sugar beets. In the following background of the invention and description of preferred embodiment, the root crop harvesting implement will be described as a sugar beet harvester, but it should be understood that reference is made to sugar beets only for the purpose of providing a specific disclosure and not for limiting the invention.

Beet harvesters have remained basically unchanged for many years and have relied primarily upon chain conveyors or potato chains to move the beets from the digger wheels to a truck or trailer running alongside the harvester or to a tank on the harvester for subsequent delivery to a truck or trailer. Potato chains by their very nature are subject to great wear and, since they run continuously while harvesting, often last only one or two harvesting seasons before they have to be completely replaced. Although the replacement of the potato chains is not a particularly difficult task, it did take considerable time, especially if replacement was required in the middle of a harvesting season, and the continual replacement of the potato chains throughout the life of the harvester became quite expensive.

SUMMARY OF THE INVENTION

The principal object of the present invention is to provide a root crop or beet harvester which uses few conveyor chains as compared to the prior art beet harvesters.

A more specific object of the present invention is to provide a beet harvester which utilizes auger conveyors to move the beets laterally and elevate them to a position where they can be deposited in a truck or trailer moving alongside the harvester.

Another object of the present invention is to provide a beet harvester which is of simplified construction, can be manufactured more economically than prior art beet harvesters, and which utilizes fewer chain conveyors which require constant replacement.

Yet another object of the present invention is to provide a beet harvester which uses augers to convey the beets and which has beet-cleaning means associated with the augers.

The above objects and additional objects and advantages of the present invention will become apparent, along with the details of construction of preferred embodiments of the invention, to those skilled in the art from a reading of the following detailed description when taken in conjunction with the accompanying drawings.

BRIEF DESCRIPTION OF THE DRAWINGS

In the drawings:

FIG. 1 is a top plan view of a beet harvester constructed in accordance with the principles of the present invention;

FIG. 4 is a view similar to FIG. 1 but illustrating a modified form of the invention;

DESCRIPTION OF THE PREFERRED EMBODIMENTS

Figure 3:
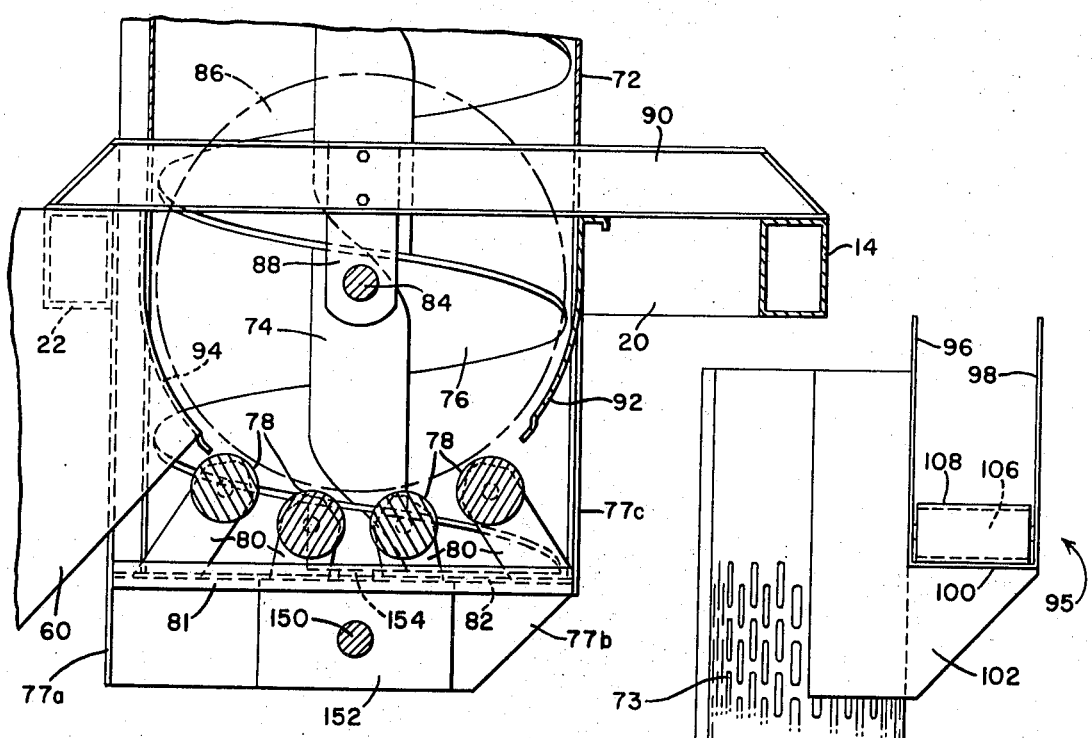
FIG. 3 is an enlarged sectional view taken substantially along the line 3—3 of FIG. 1.
Figure 2:
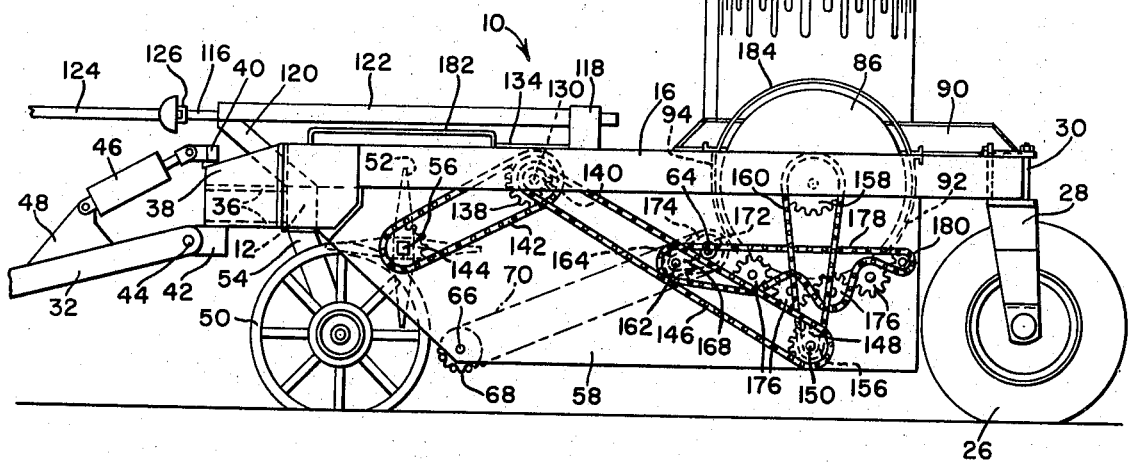
FIG. 2 is a side elevational view of the beet harvester illustrated in FIG. 1.

Referring now to the drawings, and in particular to FIGS. 1–3, the beet harvester illustrated therein is indicated generally by the numeral 10 and includes a front frame member 12, a rear frame member 14, a left side frame member 16, front and rear laterally offset right side frame members 18 and 20, an intermediate frame member 22 interconnecting the right side frame members, and a diagonal brace member 24 extending between the front and rear right side frame members.

The rear portion of the main frame is supported by a pair of wheels 26 journaled on the lower ends of fork members 28 which have their upper ends secured to the rear frame member 14. Each of the fork members 28 is releasably secured to the rear frame member 14 by a pair of clamp assemblies 30 so that by loosening the clamp assemblies, the fork members can be moved along the rear frame member 14 and the wheels positioned to conform to various row spacings.

The forward end of the main frame is supported by a forwardly extending hitch 32 which is adapted to be connected to a tractor drawbar (undisclosed). The hitch 32 is connected to the frame for both vertical and lateral movement. To this end, a vertical pivot shaft 34 is supported on the front frame member 12 by a pair of vertically spaced plates 36 secured to the front frame member 12 and by support members 38 which extend diagonally between the ends of the front frame member 12 and the forward end of the plates 36. Pivot blocks 40 and 42 are secured to the upper and lower ends, respectively, of the pivot shaft 34 and the rear end of the hitch 32 is pivotally connected to the pivot block 42 for vertical movement by a pivot pin 44. The rod end of a hydraulic cylinder 46 is pivotally connected to the pivot block 40 and the anchor end of the cylinder 46 is pivotally connected to a bracket 48 integral with the hitch 32 so that, by extending and retracting the cylinder 46, the forward end of the main frame is raised and lowered. Lateral movement of the hitch 32 about the axis of the pivot shaft 34 will be under the control of a conventional row finder unit and hydraulic cylinder which are undisclosed as they form no part of the present invention.

A pair of support plates 58 and 60 depend from the left- and right-hand sides, respectively, of the main frame and each is spaced inwardly of its respective frame bar. Each of the supporting plates 58 and 60 is provided with an upper horizontal flange portion 62 which projects toward the respective side frame member and is secured thereto in any suitable manner.

A plurality of digger wheel assemblies are secured to the front frame member 12 in spaced relation to each other and each includes a pair of lifter wheels 50 and a paddle 52. Each pair of lifter wheels is mounted on the lower end of a standard 54 which has its upper end secured to the front frame member 12 by releasable clamps which permit the wheel assemblies to be adjusted along the front frame member to conform to various row spacings.

A non-circular cross shaft 56 extends between the support plates 58 and 60 and is rotatably supported on the support plates by suitable bearings. The paddles 52 are mounted on the cross shaft 56 to be driven thereby and can be adjusted along the length of the cross shaft 56 to conform to various row spacings. The manner in which the cross shaft 56 is driven will be described hereinafter along with the description of the drive train of other components of the harvester.

A conveyor is carried by the support plates 58 and 60 directly behind the digger wheel assemblies and includes upper and lower transverse shafts 64 and 66 which extend between and are journaled on the support plates 58 and 60. Sprocket wheels 68 are mounted on the shafts 64 and 66 and serve to mount and drive a potato chain 70 which receives beets from the digger wheel assemblies and conveys the same upwardly and rearwardly. As an alternative to the shaft 66 and the sprocket wheels mounted thereon, the lower end of the chain 70 could be supported by a pair of conventional cantilever-mounted cone rollers.

A vertical auger conveyor is supported by the main frame between the rear frame member 14 and the intermediate frame member 22 and includes a cylindrical housing 72 which is provided with a plurality of openings 73 forming a cleaning grate. The auger housing is closed at both ends, but has a laterally directed opening adjacent its lower end and a rearwardly directed opening adjacent its upper end. An auger including a core 74 and a helical flighting 76 secured to the core is journaled within the housing 72 to elevate beets from the lower opening in the housing to the upper opening in the housing. Although not illustrated in the drawings or described therein, the vertical auger is preferably of the type illustrated, described and claimed in the above-mentioned copending application Ser. No. 209,116. Protective plates 77a, 77b and 77c are secured to the lower end of the auger housing and the main frame at the front, side and rear, respectively, of the auger housing to help secure the auger housing to the main frame and to also provide protection for the lower end of the auger housing. The precise manner in which the vertical auger conveyor is secured to the main frame forms no part of the present invention since numerous alternatives will be apparent to those skilled in the art.

A plurality of elongated grab rolls 78 each have one end journaled in the support plate 58 and an opposite end journaled on a bracket 80 carried on a mounting bar 81 secured to the bottom wall 82 of the housing 72. A cross auger including a central core 84 and a helical flighting 86 has one end journaled in the support plate 58 above the grab rolls 78 and its opposite end journaled in a bracket 88 depending from a cross bar 90 extending between the frame members 14 and 22. The grab rolls 78 are positioned parallel to one another, and to the axis of rotation of the cross auger to form a trough for the cross auger. A curved shield 92 directly to the rear of the cross auger extends between the support plate 58 and the housing 72 in close proximity to the rear of the cross auger to form a continuation of the trough for the cross auger. The right-hand ends of the grab rolls and cross auger extend beyond the right-hand side of the potato chain 70 and an additional curved shield 94 extends between the support plate 60 on the right side of the main frame to the housing 72 in close proximity to the front of the cross auger to form a continuation of the trough therefor.

An additional conveyor indicated generally at 95 is mounted on the upper end and to the rear of the vertical auger in beet-receiving relationship to the opening provided in the upper end of the auger and includes a pair of side walls 96 and 98 and a bottom wall 100. A pair of plates 102 and 104 are secured to the housing 72 of the vertical auger and each have a section projecting under the bottom wall 100 of the additional conveyor to provide support therefor. The plates 102 and 104 also provide a guide for the beets between the vertical auger conveyor and the additional conveyor. A plurality of rollers 106 are rotatably mounted between the side walls 96 and 98 and an endless flexible element 108 in the form of a belt or potato chain is trained about the rollers to deliver beets laterally outwardly for deposit into a truck or trailer moving alongside of the harvester. A hydraulic motor 110 is mounted on the side wall 96 and operatively connected to one of the rollers 106 to provide the power to drive the endless flexible element 108. A pair of hydraulic lines 112 and 114 extend from the hydraulic motor 110 and are adapted to be connected to the hydraulic system of the tractor to which the harvester is coupled. The conveyor 295 also extends laterally inwardly from the vertical auger conveyor, but this feature is unimportant as far as the present invention is concerned. For an understanding of why the upper conveyor 295 also projects inwardly from the vertical auger conveyor, reference can be had to the above-mentioned copending U. S. application Ser. No. 209,123.

The drive train for the movable components of the harvester includes a main drive shaft extending from a central portion of the main frame to the power take-off of the tractor. The main drive line includes a first portion 116 which has its rear end journaled in a transfer box 118 and its forward end journaled on a support member 120 secured to the forward frame member 12. A guard 122 covers the first portion 116 of the main drive line. A second portion 124 of the main drive line is connected to the first portion 116 by a U-joint 126 and extends forwardly to the tractor. A chain in the transfer box 118 transfers power from the drive shaft 116 to a gear box 128 which drives oppositely extending shafts 130 and 132 in opposite directions. The shaft 130 is driven in a counterclockwise direction when viewed from the left as illustrated in FIG. 2 and the shaft 132 is driven in a clockwise direction when viewed from the left. The shafts 130 and 132 extend through the support plates 58 and 60, and are covered by shields 134. A sprocket wheel 136 is mounted on the outer end of the shaft 132 and a pair of sprocket wheels 138 and 140 are mounted on the outer end of the shaft 130. A drive chain 142 is trained about the sprocket wheel 138 and a sprocket wheel 144 on the left-hand end of the cross shaft 56 for the paddles 52 so that the paddles 52 are driven in a counterclockwise direction as viewed in FIG. 2.

A chain 46 is trained about the sprocket wheel 140 and extends rearwardly and downwardly to a sprocket wheel 148 mounted on the left-hand end of a drive shaft 150 which has its left-hand end journaled in a lower rear portion of the support plate 58 and extends laterally across the implement to a right-angle gear box 152 which is mounted on the bottom wall of the housing 72 for the vertical auger conveyor and which has an output shaft 154 connected to the core 74 of the vertical auger. An additional sprocket wheel 156 on the drive shaft 150 is interconnected with a sprocket wheel 158 for the cross auger by a chain 160. By having the vertical auger and cross auger driven from the same shaft 150, they remain properly timed for efficient transfer of beets from one auger to the other.

An additional cross shaft 162 extends between the upper and lower flights of the potato chain 70, has its ends journaled in the support plates 58 and 60, has a pair of sprocket wheels 164 and 166 mounted on its right-hand end, and has a sprocket wheel 168 mounted on its left-hand end. A drive chain 170 is trained about the sprocket wheels 136 and 164 on the shafts 132 and 162, respectively, for driving the shaft 162. A sprocket wheel 172 on the end of the upper shaft 64 for the potato chain 70 is interconnected with the sprocket wheel 166 on the shaft 162 by a chain 174 to drive the potato chain 170.

Sprocket wheels 176 are mounted on the left-hand ends of the grab rolls 78 and are interconnected with the sprocket wheel 168 on the left-hand end of the shaft 162 by a chain 178. The lower flight of the chain 178 passes alternately under and over alternate sprocket wheels 176 to drive adjacent grab rolls in opposite directions, and at its end remote from the sprocket 168 passes about an idler sprocket wheel 180. As an alternate arrangement, the grab rolls could all be driven in the same direction as the cross auger.

To cover some of the moving parts and add to the appearance of the beet harvester, a cover plate 182 is mounted on the forward portion of the main frame over the digger wheel assemblies, and a cover 184 is mounted over the cross auger.

The operation of the beet harvester is as follows. The tractor operator will engage the tractor power take-off to drive the main drive shafts 124 and 116 to provide power to the various driven components of the harvester and will also adjust a hydraulic valve on the tractor to interconnect the conventional source of fluid pressure on the tractor with the hydraulic motor 110 for the upper conveyor 95. The operator will also make the necessary manipulations of the hydraulic system on the tractor to retract the cylinder 46 to lower the forward end of the main frame so that the lifter wheels 50 will extend into the ground to the proper position for removing beets. As the harvester is moved forward, the lifter wheels 50 will pinch and raise the beets and the paddles 52 will contact and throw the beets rearwardly onto the potato chain 70. The potato chain 70 conveys the beets rearwardly and deposits them on the grab rolls 78.

The rotation of the grab rolls provides a scrubbing action on the beets to clean foreign material therefrom. The foreign material removed from the beets is deposited through the openings between the grab rolls. As the beets are being cleaned by the grab rolls, they are also moved laterally toward the vertical auger conveyor by the flighting 86 on the cross auger. If the beet harvester is working in muddy conditions so that a relatively large amount of mud remains on the beets when they are transferred to the grab rolls, the mud will have a tendency to pack onto the grab rolls which will make the grab rolls much too aggressive and could easily crush the beets between the grab rolls. However, this condition is prevented by the close proximity of the grab rolls to the flighting 86 of the cross auger since the flighting 86, as it moves along the grab rolls, will remove any excess mud which is packed onto the grab rolls.

As the beets are transferred from the cross auger conveyor to the vertical auger conveyor, the flighting 76 of the vertical auger conveyor raises the beets to a point where they are transferred through the opening in the rear of the upper end of the housing 72 onto the belt 108 of the upper conveyor 95. The belt 108 transfers the beets outwardly and deposits the same into a truck or trailer moving alongside the harvester. Centrifical force upon the beets in the vertical auger forces them against the housing 72 so that the beets will be further cleaned as they slide along the cleaning grates.

Figure 6:
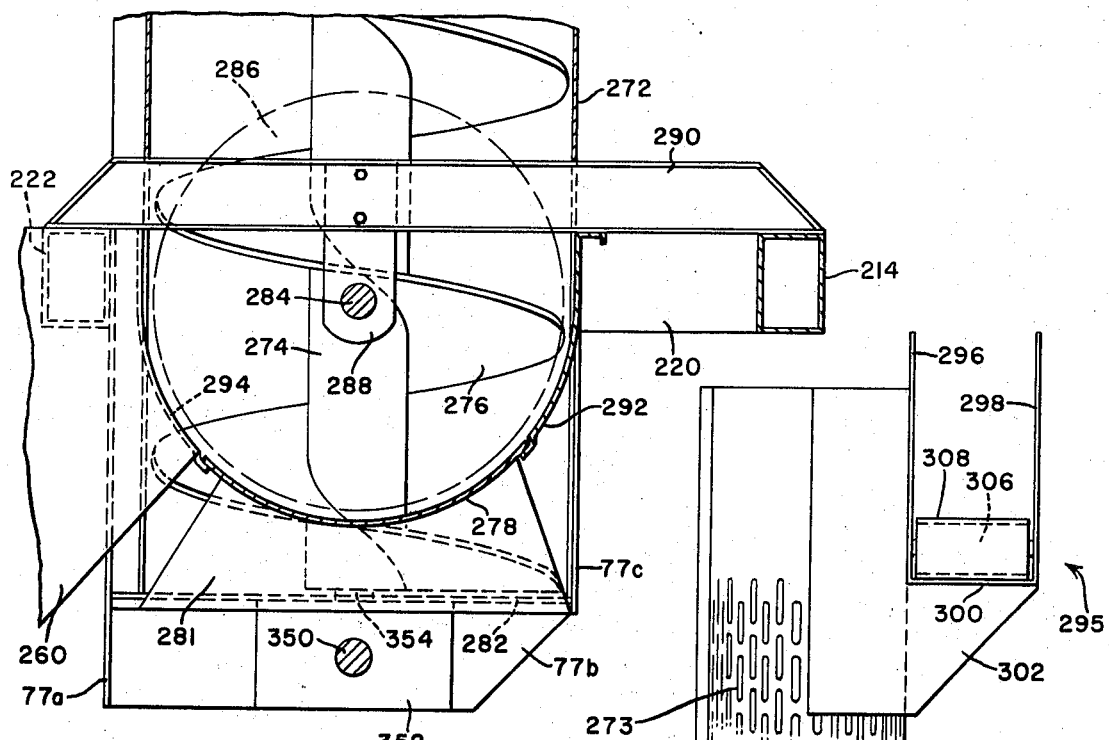
FIG. 6 is an enlarged sectional view taken substantially along the line 6—6 of FIG. 4.
Figure 5:
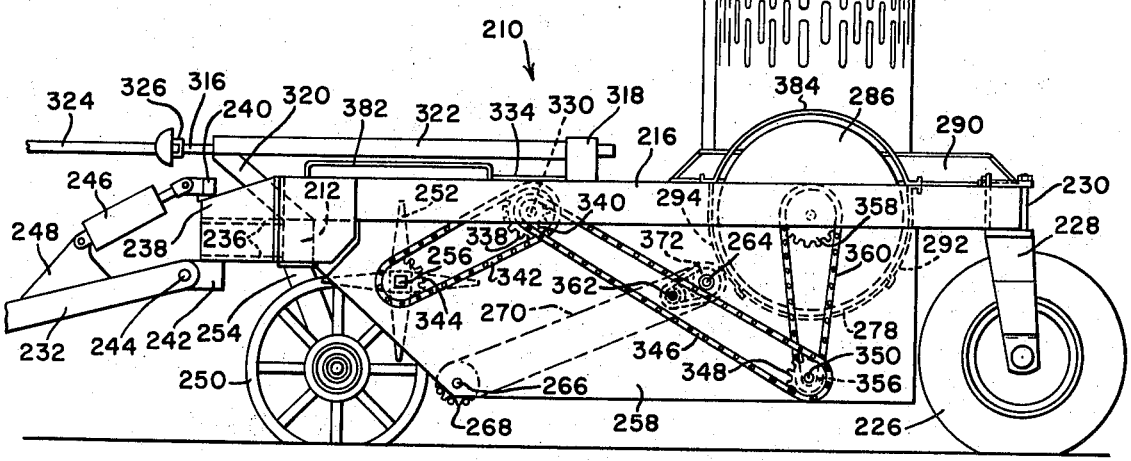
FIG. 5 is a side elevational view of the harvester illustrated in FIG. 4.

A slightly modified form of the invention is illustrated in FIGS. 4-6 and in essence differs from the harvester illustrated in FIGS. 1-3 by the elimination of the grab rolls. The harvester illustrated in FIGS. 4-6 is indicated generally at 210 and includes a main frame having a front frame member 212, a rear frame member 214, a left side frame member 216, front and rear right side frame members 218 and 220, an intermediate frame member 222, and a brace 224 extending between the front and rear right frame members. The rear of the main frame is supported by a pair of wheels 226 journaled on the lower end of fork members 228 which have their upper ends secured to the rear frame member 214 by clamps 230. By loosening the clamps 230, the fork members 228 and wheels 226 can be adjusted along the rear frame member 214 to compensate for various row spacings.

The forward end of the main frame member is supported by a hitch 232 which is adapted to have its forward end connected to a tractor drawbar. The hitch 232 is connected to the front of the main frame for both lateral and horizontal movement. To this end a pivot post 234 is supported from the front frame member by a pair of vertically spaced forwardly extending plates 236 and a pair of support members 238 which extend from the ends of the front frame member 212 to the forward end of the plates 236. Pivot blocks 240 and 242 are secured to the upper and lower ends, respectively, of the pivot post 234 and the rear end of the hitch 232 is pivotally connected to the pivot block 242 by a horizontal pivot pin 244. The rod end of a cylinder 246 is pivotally connected to the upper pivot block 240, and the anchor end of the cylinder 246 is pivotally connected to a bracket 248 on the hitch 232 so that, upon extension and retraction of the cylinder 246, the front of the main frame will be raised and lowered.

A pair of left and right side support plates 258 and 260, respectively, are secured and depend from the main frame and are spaced slightly inwardly from the left and right frame members 216 and 218. Each of the support plates is provided with a flange 262 at its upper end which projects towards and is secured to the respective frame member.

A plurality of digger wheel assemblies are spaced along the front of the main frame and each includes a pair of lifter wheels 250 and a paddle 252. Each pair of lifter wheels are mounted on the lower end of a standard 254 which has its upper end releasably secured to the front frame member 212 by clamps or the like so that the lifter wheels can be moved along the front frame member to adjust for various row spacings. A non-circular shaft 256 extends between and has its ends journaled in the support plates 258 and 260 by suitable bearings. The paddles 252 are mounted on the shaft 256 for rotation therewith and each is adjustable along the shaft 256 to compensate for various row spacings.

A chain conveyor or potato chain is supported by the support plates 256 and 260 directly behind the lifter wheels 250 and includes upper and lower shafts 264 and 266 which are journaled in the support plates. Sprockets 268 are mounted on the shafts 264 and 266 and serve to mount and drive the chain 270.

A vertical auger conveyor is mounted at the right-hand side of the main frame between the rear frame member 214 and intermediate frame member 222 and includes a vertical housing 272 which is provided with a plurality of openings 273 forming a cleaning grate. Both ends of the auger housing 272 are closed, but the housing includes a laterally directed opening adjacent its lower end and a rearwardly directed opening adjacent its upper end. An auger including a central core 274 and a helical flighting 276 secured to the central core is journaled within the housing 272 to move beets from the lower opening to the upper opening. Although not illustrated in the drawings or described herein, the vertical auger is preferably of the type illustrated, described and claimed in the above-mentioned copending application Ser. No. 209,116. Plates 77a, 77b and 77c are secured to the lower end of the auger housing and the main frame at the front, side and rear, respectively, of the auger housing to help secure the auger housing to the main frame and to also provide protection for the lower end of the auger housing. The precise manner in which the vertical auger conveyor is secured to the main frame forms no part of the present invention since numerous alternatives will be apparent to those skilled in the art.

A sheet metal trough 278 extends between the support plate 258 and the opening in the lower portion of the housing 272 and is provided with a plurality of openings 280 for a purpose to be explained hereinafter. The end of the trough 278 adjacent the opening in the housing 272 is provided with a downwardly depending flange 281 which is secured to the bottom wall 282 of the housing 272 to provide support for the trough 278.

A cross auger having a core 284 and a helical flighting 286 secured to the core is mounted for rotation within the trough 278. One end of the cross auger is journaled in the support plate 258 and the other end is journaled in a bracket 288 depending from a crossbar 290 which extends between and is secured to the intermediate frame member 222 and the rear frame member 214. An arcuate shield 292 directly behind the cross auger extends between the support plate 258 and the housing 272 to form a continuation of the trough for the cross auger. The trough 278 and cross auger extend laterally beyond the right side of the potato chain 270 and an arcuate shield 294 directly in front of the cross auger extends between the support plate 260 and the housing 272 to form a front continuation of the trough for the cross auger.

An upper conveyor indicated generally at 295 is secured to the rear of and adjacent the upper end of the vertical auger conveyor in beet-receiving relationship to the opening in the upper end of the housing 272 and includes side walls 296 and 298 and a bottom wall 300. The conveyor 295 is supported by a pair of plates 302 and 304 which are secured to the housing 272 and include a portion projecting under the conveyor 295. The plates 302 and 304 also provide a guide for the beets as they move from the housing 272 to the conveyor 295. A plurality of rollers 306 are journaled between the side walls 296 and 298 and an endless belt or potato chain 308 is trained about the rollers. A hydraulic motor 310 is secured to the side wall 296 and is connected to one of the rollers 306 to drive the endless belt 308. A pair of hydraulic lines 312 and 314 extend from the motor 310 and are adapted to be connected to the conventional hydraulic system on the tractor to which the harvester is coupled. The conveyor 295 also extends laterally inwardly from the vertical auger conveyor, but this feature is unimportant as far as the present invention is concerned. For an understanding of why the upper conveyor 295 also projects inwardly from the vertical auger conveyor, reference can be had to the above-mentioned copending U. S. application Ser. No. 209,123.

The drive train for the driven components of the harvester includes a main drive line having a rear portion 316 which has its rear end rotatably supported in a transfer box 318 and its forward end journaled on the upper end of a support 320 on the front frame member. A shield 322 for the rear portion 316 of the main drive line extends between the transfer box 318 and its support 320. The front portion 324 of the main drive line is connected to the rear portion 316 by a U-joint 236 and is adapted to be connected to the conventional power take-off on the tractor to which the harvester is connected. A sprocket and chain assembly in the transfer box 318 transmits power from the main drive line to a gear box 328 which drives oppositely extending shafts 330 and 332 in opposite directions. The shaft 330 is driven in a counterclockwise direction as viewed from the left, and the shaft 332 is driven in a clockwise direction as viewed from the left. The shafts 330 and 332 project through and are journaled in the support plates 258 and 260 and are covered by a shield 334. A sprocket wheel 336 is mounted on the outer end of the shaft 332, and a pair of sprocket wheels 338 and 340 are mounted on the outer end of the shaft 330. A chain 342 is trained about the sprocket wheel 338 and a sprocket wheel 344 on the left-hand end of the shaft 256 to drive the paddles 252 in a counterclockwise direction.

A drive chain 346 is trained about the sprocket wheel 340 and extends downwardly and rearwardly where it is trained about a sprocket wheel 348 mounted on the left end of a shaft 350 which is journaled in the support plate 258 and extends across the harvester to a right-angle gear box 352 secured to the bottom wall 282 of the housing 272. The gear box 352 has an output shaft 354 connected to the core 274 of the vertical auger. An additional sprocket wheel 356 is mounted on the left-hand end of the shaft 350 and is interconnected with a sprocket wheel 358 secured to the left-hand end of the core 284 of the cross auger by a drive chain 360. By having the cross auger and vertical auger driven from the common shaft 350, the two augers remain properly timed for efficient transfer of beets from one auger to the other.

A jackshaft 362 is journaled on the support plate 260 and has a pair of sprocket wheels 364 and 366 mounted thereon. A chain 370 is trained about the sprocket wheels 336 and 364 on the shafts 332 and 362 respectively to drive the shaft 362. A sprocket wheel 372 is mounted on the right-hand end of the shaft 264 and is interconnected with the sprocket wheel 366 by a chain 374 to drive the potato chain 270.

To provide shielding for some of the moving parts and to enhance the appearance of the harvester, a cover shield 382 is mounted on the main frame over the digger wheel assemblies and a cover 384 is mounted on the main frame over the helical flighting 286 of the cross auger.

The operation of the beet harvester illustrated in FIGS. 4–6 is essentially the same as that illustrated in FIGS. 1–3, but in the embodiment illustrated in FIGS. 4–6 there are no grab rolls to clean the beets. The harvester illustrated in FIGS. 4–6 is essentially for use in dryer soil conditions where less trash and soil remain on the beets by the time they reach the trough 278. The remaining soil on the beets when they reach the trough 278 will be removed by a grating action of the beets over the openings 280 provided in the trough 278 and by the grating action of the beets as they slide along the openings 273.

From the foregoing, it can be seen that the present invention provides a beet harvester which is of simple construction, which eliminates many of the potato chains previously considered necessary in beet harvesters and also provides a beet harvester which will provide a thorough job of cleaning the beets.

Although two embodiments of the invention have been described and illustrated, various modifications within the spirit and scope of the invention will become apparent to those skilled in the art and can be made without departing from the underlying principles of the invention. Therefore, the invention should not be limited by the specific illustrations and descriptions, but only by the following claims.

We claim:

1. A root crop harvester comprising: a main frame; root digging means secured across the forward end of the frame; elevator means including a substantially upright auger conveyor mounted on the frame for moving roots from the lower end thereof upwardly to a deposit area; and conveyor means suported on the main frame to receive roots from the digging means and moving the same upwardly and laterally from the root digging means to the lower end of the upright auger conveyor.

2. A root crop harvester as set forth in claim 1 wherein the elevator means further includes a lateral conveyor means mounted on the upper end of the auger conveyor in root-receiving relationship therewith.

3. A root crop harvesting implement including forward root digging means, first conveyor means rearwardly of the digging means for receiving roots from the digging means and conveying the same upwardly and rearwardly, second conveyor means for receiving roots from the first conveyor means and moving the same laterally, and elevator means at one end of the second conveyor means for receiving roots from the one end of the second conveyor means and elevating the same to an upper deposit area, characterized in that the elevator means includes a substantially upright auger conveyor having its lower end adjacent the one end of the second conveyor means and a third conveyor means carried at the upper end of the auger conveyor in root-receiving relationship thereto.

4. A root crop harvesting implement as set forth in claim 3 further characterized in that the second conveyor means includes elongated trough means extending transversely along the upper rear end of the first conveyor means and an auger journaled in the trough means for moving roots deposited in the trough means along the trough to the lower end of the upright auger conveyor.

5. A root crop harvesting implement as set forth in claim 4 further characterized in that the trough means is provided with a plurality of openings which provide a scrubbing action on the roots as they are moved along the trough to remove foreign material.

6. A root crop harvesting implement as set forth in claim 5 further characterized in that the upright auger conveyor includes an elongated cylindrical housing and an auger rotatably mounted in the housing, and the housing is provided with a plurality of openings which provide a scrubbing action as the roots are moved along the housing.

7. A root crop harvesting implement as set forth in claim 4 further characterized in that the trough means is at least partially formed by a plurality of elongated grab rolls extending generally parallel to and positioned closely adjacent to the axis of rotation of the auger of the second conveyor means.

8. A root crop harvesting implement including forward digger wheel assemblies, first conveyor means rearwardly of the digger wheel assemblies for receiving roots from the wheel assemblies and conveying the same upwardly and rearwardly, second conveyor means for receiving roots from the first conveyor means and moving the same laterally, and elevator means at one end of the second conveyor means for receiving roots therefrom and elevating the same to an upper deposit area, characterized in that the second conveyor means and the elevator means both include an auger conveyor and the auger conveyor of the elevator means is substantially upright.

9. A root crop harvesting implement as set forth in claim 8 further characterized in that the auger conveyor of the second conveyor means includes a plurality of elongated, parallel, and closely positioned grab rolls forming a trough and an auger rotatably mounted in the trough.

10. A root crop harvesting implement as set forth in claim 8 further characterized in that the auger conveyor of the second conveyor includes an elongated trough member extending along the rear end of the first conveyor means in root-receiving relationship thereto, and an auger rotatably mounted in the trough.

11. A root crop harvesting implement as set forth in claim 10 further characterized in that the trough member is provided with a plurality of openings for the discharge of foreign material.

12. A root crop harvesting implement including a plurality of side-by-side forward digger wheel assemblies, first conveyor means rearwardly of the digger wheel assemblies for receiving roots from the digger wheel assemblies and conveying the same upwardly and rearwardly, second conveyor means including an auger conveyor for receiving roots from the first conveyor means and moving the same laterally, elevator means at the one end of the second conveyor means including a substantially upright auger conveyor for receiving roots from the second conveyor means and moving the same upwardly, and third conveyor means mounted at the upper end of the elevator means for receiving roots therefrom and moving the same in the same lateral direction as the second conveyor means to an outer deposit area.

* * * * *